United States Patent
Gil et al.

(10) Patent No.: US 9,430,218 B2
(45) Date of Patent: Aug. 30, 2016

(54) APPARATUS AND METHOD OF EXECUTING UPDATE, RECORDING MEDIUM USING THE SAME, AND SERVER AND METHOD OF PROVIDING UPDATE

(71) Applicant: SAMSUNG SDS CO., LTD., Seoul (KR)

(72) Inventors: Ji Joong Gil, Yongin-si (KR); Nam Soo Jeon, Seoul (KR); Hyun Woo Jung, Seongnam-si (KR); Jae Seok Choi, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 14/528,012

(22) Filed: Oct. 30, 2014

(65) Prior Publication Data

US 2015/0121360 A1  Apr. 30, 2015

(30) Foreign Application Priority Data

Oct. 30, 2013 (KR) ........................ 10-2013-0130281

(51) Int. Cl.
  *G06F 9/44* (2006.01)
  *G06F 9/445* (2006.01)
  *H04L 29/06* (2006.01)
  *H04L 29/08* (2006.01)

(52) U.S. Cl.
  CPC .................. *G06F 8/65* (2013.01); *H04L 67/32* (2013.01); *H04L 67/34* (2013.01); *H04L 67/42* (2013.01)

(58) Field of Classification Search
  CPC ....................................................... G06F 8/65

USPC ................................................. 717/168–178
See application file for complete search history.

(56) References Cited

U.S. PATENT DOCUMENTS 8,065,362 B2 * 11/2011 Greven et al. ................ 709/203
2012/0304181 A1 * 11/2012 Jensen et al. ................. 718/102

FOREIGN PATENT DOCUMENTS

JP   2007-158425 A   6/2007
JP   2007-310659 A   11/2007

(Continued)

OTHER PUBLICATIONS

John Mravunac, "Keeping Red Hat Linux Systems Secure with up2date", 2003, SANS Institute, 22 pages.*

(Continued)

*Primary Examiner* — Ted T Vo
(74) *Attorney, Agent, or Firm* — Sughrue Mion, PLLC (57) ABSTRACT

Provided is an apparatus for executing an update, which executes an update of a specific application installed in a device, the apparatus including: a predetermined value receiving unit configured to receive information on a randomly selected value among values within a predetermined range from an update providing server; an open date receiving unit configured to receive information on an update open time from the update providing server; an update time calculating unit configured to calculate an update time of the specific application by using the received information on the randomly selected value and on the update open time; an update information receiving unit configured to receive update information about the specific application after the calculated update time; and an update executing unit configured to execute an update of the specific application by using the received update information.

7 Claims, 4 Drawing Sheets

(56) References Cited

FOREIGN PATENT DOCUMENTS

JP      2008-134992 A    6/2008
JP      2010-049655 A    3/2010

OTHER PUBLICATIONS

Len DiMaggio, "Understanding your (Red Hat Enterprise Linux) daemons", 2010, Red Hat Magazine, 16 pages.*

ICU User Guide, "Formatting Dates and Times", 2012, retrieved from http://userguide.icu-project.org/formatparse/datetime, 7 pages.*

Mynda Treacy, "Calculating Time in Excel", 2010, retrieved from http://www.myonlinetraininghub.com/calculating-time-in-excel, 7 pages.*

Communication dated Jun. 10, 2015, issued by the Korean Intellectual Property Office in counterpart Korean Application No. 10-2013-0130281.

Communication dated Mar. 2, 2016, issued by the Korean Intellectual Property Office in counterpart Korean Application No. 10-2013-0130281.

* cited by examiner

FIG. 1
APPLICATION UPDATE SYSTEM(1000)

APPARATUS AND METHOD OF EXECUTING UPDATE, RECORDING MEDIUM USING THE SAME, AND SERVER AND METHOD OF PROVIDING UPDATE

CROSS-REFERENCE TO RELATED APPLICATION

This application claims priority from Korean Patent Application No. 10-2013-0130281 filed on Oct. 30, 2013 in the Korean Intellectual Property Office, and all the benefits accruing therefrom under 35 U.S.C. 119, the contents of which in its entirety are herein incorporated by reference.

TECHNICAL FIELD

The present invention relates to an apparatus and a method of executing an update, a recording medium using the same, and a server and a method of providing an update. More particularly, the present invention relates to an apparatus and a method of executing an update, which prevent overload of an update providing server, a recording medium using the same, and a server and a method of providing an update.

BACKGROUND

Recently, use of smart devices, such as a smart phone and a tablet PC, has rapidly increased. One of the advantages of the smart device is that the smart device is capable of using various applications.

One of the advantages of the smart device is that various applications are installable in the smart device for use.

The applications need to be frequently updated due to various reasons.

An application used as an operating system of the smart device needs to be frequently updated for various reasons, such as performance improvement, security improvement, and error correction.

Currently, there is a problem in that an application of the smart device is updated without considering a load to a server, and a manager waits for an update at an update date and time (commonly, dawn at which a concentration of a load to the server is low).

SUMMARY

The inventive concept has been made in an effort to provide an apparatus and a method of executing an update, which prevent overload of an update providing server by differently setting an update start time for each of the devices, which perform an update of an application installed in the device through the update providing server, and distributing access to the update providing server, a recording medium using the same, and a server and a method of providing an update.

The present invention has been also made in an effort to provide an apparatus and a method of executing an update, in which an update providing server sets an update start date, does not provide a user with an update item before the set update start date, and provides a user with an update item after the update start, so that a manager does not need to wait for an update start time, and a recording medium using the same, and a server and a method of providing an update.

Technical objects of the present invention are not limited to the aforementioned technical objects and other technical objects which are not mentioned will be apparent to those skilled in the art from the following description.

An embodiment of the present invention provides an apparatus for executing an update of a specific application installed in a device, including: a predetermined value receiving unit configured to receive information on a randomly selected value among values within a predetermined range from an update providing server; an open date receiving unit configured to receive information on an update open time from the update providing server; an update time calculating unit configured to calculate an update time of the specific application by using the received information on the randomly selected value and on the update open time; an update information receiving unit configured to receive update information about the specific application after the calculated update time; and an update executing unit configured to execute an update of the specific application by using the received update information.

Another embodiment of the present invention provides a method of executing an update, which updates a specific application installed in a device, including: a predetermined value receiving operation of receiving information on a randomly selected value among values within a predetermined range from an update providing server; an open date receiving operation of receiving information on an update open time from the update providing server; an update time calculating operation of calculating an update time of the specific application by using the received information on the randomly selected value and on the update open time; an update information receiving operation of receiving update information about the specific application from the update providing server at the calculated update time; and an update executing operation of executing an update of the specific application by using the received update information.

Another embodiment of the present invention provides a recording medium for recording a program, the program performing: receiving information on a randomly selected value among values within a predetermined range from an update providing server; receiving information on an update open time from the update providing server; calculating an update time of the specific application by using the received information on the randomly selected value and the information on the update open time; receiving update information about the specific application from the update providing server at the calculated update time; and executing an update of the specific application by using the received update information.

Another embodiment of the present invention provides a server for providing an update, including: an open date transmitting unit configured to transmit information on an update open time for a specific application to a device; a request receiving unit configured to receive information requesting an update of the specific application installed in the device from the device; a requested time determining unit configured to determine whether a time of receiving the update request information is after the update open time; and an update information transmitting unit configured to transmit update information on the specific application to the device when the update request time is after the update open time as a result of the determination of the requested time determining unit.

Another embodiment of the present invention provides a method of providing an update, including: an open date transmitting operation of transmitting information on an update open time to a device; a request receiving operation of receiving information requesting an update of the specific application installed in the device from the device; a request time determining operation of determining whether a time of receiving the update request information is after the update open time; and an update information transmitting operation of transmitting update information on the specific application to the device when the update request time is after the update open time as a result of the determination of the requested time determining unit.

According to the embodiments of the present invention, it is possible to prevent a load from being concentrated to the update providing server.

According to the embodiments of the present invention, it is possible to enable users to smoothly and more rapidly update an application installed in a device by preventing a load from being concentrated onto the update providing server.

According to the embodiments of the present invention, an update start time is set and the update start time is provided to each device, so that a manager does not need to wait for an update at an update open time.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE EMBODIMENTS

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The present invention relates to execution of an update of an application stored in a smart device (hereinafter, referred to as a "device"), such as a smart phone and a tablet PC, which is capable of performing wireless communication, installing and executing an operating system application, and installing and executing various applications.

Contrary to an existing application update performing method, the present invention relates to an invention, which considers a load of an update providing server, which provides an update, and does not demand a manager to wait for an update at an update date.

The present invention will be described in more detail with reference to the accompanying drawings.

Figure 1:
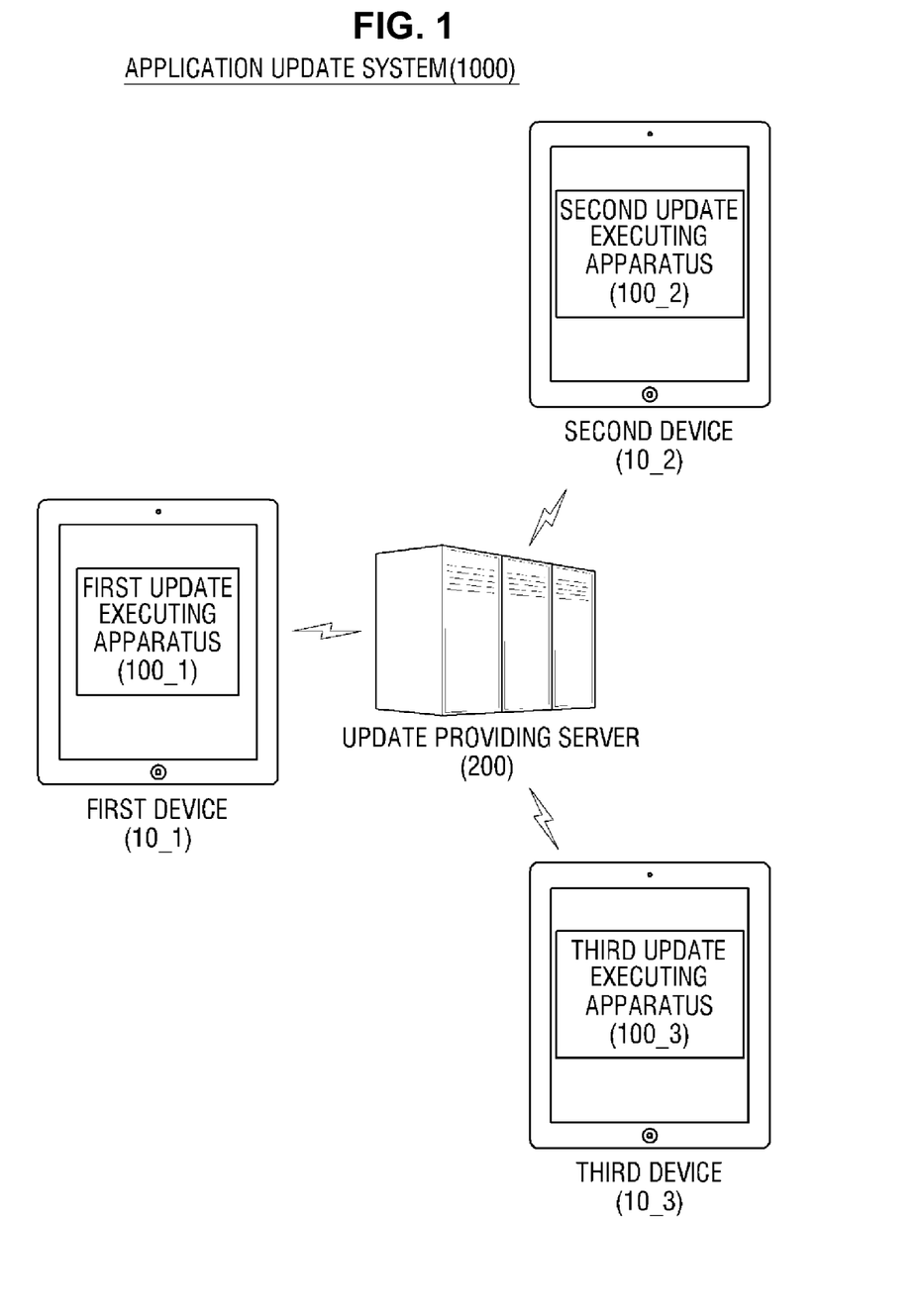
FIG. 1 is a configuration diagram illustrating an example of an application update system according to the present invention.

FIG. 1 is a configuration diagram illustrating an example of an application update system according to the present invention.

Referring to FIG. 1, an application update system 1000 according to the present invention includes one or more devices 10_1, 10_2, and 10_3 including update executing apparatuses 100_1, 100_2, and 100_3 of the present invention, and an update providing server 200 for providing information about a file necessary for updating a specific application installed in each device.

The specific application means an application among applications installed in each device, to which the update providing server 200 provides update information or which the update providing server 200 desires to update.

The specific application may be various kinds of application, such as an operating system application and a security-related application installed in the device.

Each device and the update providing server 200 may perform information transception and an update of a specific application by using wire and wireless communication.

The number of devices, to which the update providing server 200 provides update information, may be tens of thousands and hundreds of thousands or more, but for helping understanding of the description of the present invention, the present invention will be described based on one device, the update executing apparatus 100 included in one device, and an update providing apparatus as an example.

Figure 2:
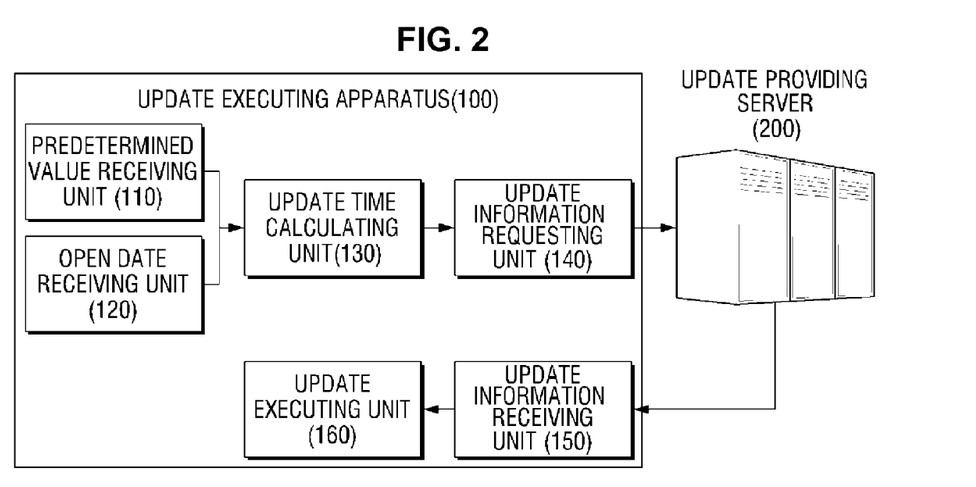
FIG. 2 is a block diagram illustrating an update executing apparatus according to an embodiment of the present invention.

FIG. 2 is a block diagram illustrating the update executing apparatus according to an embodiment of the present invention.

Referring to FIG. 2, the update executing apparatus 100 according to the embodiment of the present invention includes a predetermined value receiving unit 110, an open date receiving unit 120, an update time calculating unit 130, an update information requesting unit 140, an update information receiving unit 150, and an update executing unit 160.

The predetermined value receiving unit 110 may receive information on a value randomly selected from values within a predetermined range from the update providing server 200.

A detailed description about the value randomly selected from the values within the predetermined range will be described in detail when a predetermined value transmitting unit 210 is described below with reference to FIG. 3.

The open date receiving unit 120 may receive information on an update open time from the update providing server 200.

A detailed description about the update open time will be described in detail when an open date transmitting unit 220 is described below with reference to FIG. 3

The update time calculating unit 130 may calculate an update time of a specific application installed in the device by using the information on the randomly selected value received by the predetermined value receiving unit 110 and the information on the update open time received by the open date receiving unit 120.

Particularly, the update time calculating unit 130 may calculate an update time of a specific application by adding the randomly selected value received by the predetermined value receiving unit 110 to the update open time received by the open date receiving unit 120.

More particularly, the update time calculating unit 130 may convert the update open time received by the open date receiving unit 120 in the unit of a millisecond, convert the randomly selected value received by the predetermined value receiving unit 110 in the unit of a millisecond, and calculate an update time by adding the update open time converted in the unit of a millisecond and the randomly selected value (predetermined value) converted in the unit of a millisecond.

That is, f(x) sets a time obtained by adding the predetermined value to the update open time as an update time of a corresponding device. For helping particular description, the present invention is described based on the case where the update time calculating unit converts the update open time in the unit of a millisecond as an example, but may be changed according to an operation environment of a device or an application, setting by a manager, an update environment, and the like.

A predetermined function may be equal for each update executing apparatus 100 included in each device.

However, the update start time provided to the respective devices by the update providing server 200 may be the same, but predetermined values provided to most of the devices may be different from each other, so that the update times calculated by the respective devices may be mostly different from each other. The update times of the respective devices are mostly different from each other, so that a possibility in that a load is concentrated to the update providing server is substantially low.

When a time reaches the update time calculated by the update time calculating unit 130, the update information requesting unit 140 may request provision of the update information from the update providing server 200.

The update information receiving unit 150 may receive the update information, such as a file for an update of the specific application, from the update providing server 200 as a response to the request of the update information requesting unit 140.

The update executing unit 160 may execute the update of the specific application installed in the device by using the update information received by the update receiving unit.

That is, one of the technical features of the present invention is to prevent a load from being concentrated to the update providing server 200 because the respective devices, which receive the update information from the update providing server 200 and desire to update the applications, may execute an update after different predetermined times from the update open time.

Figure 3:
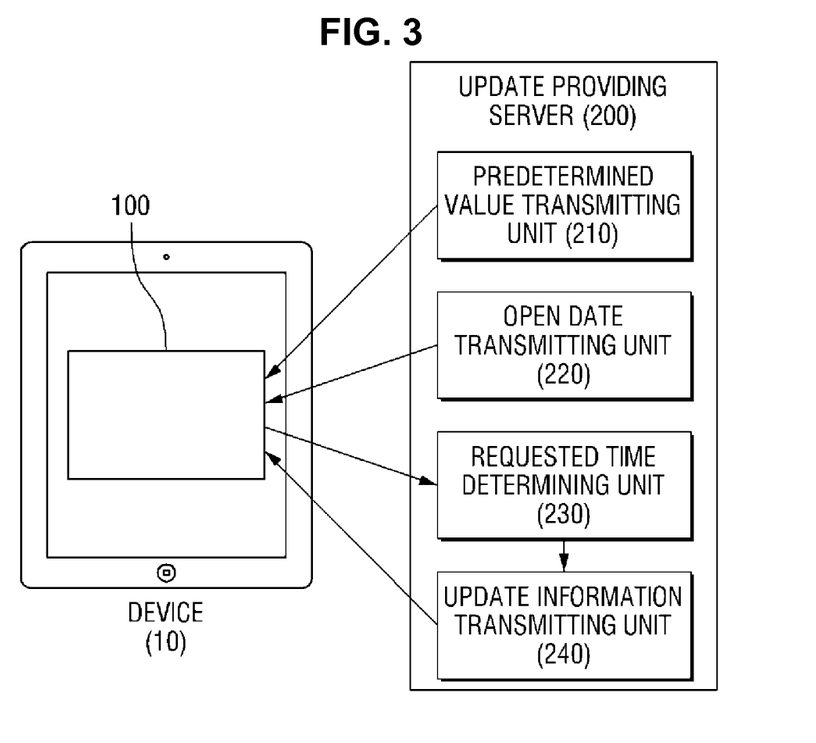
FIG. 3 is a block diagram illustrating an update providing server according to an embodiment of the present invention.

FIG. 3 is a block diagram illustrating the update providing server according to the embodiment of the present invention.

Referring to FIG. 3, the update providing server 200 according to the embodiment of the present invention may include the predetermined value transmitting unit 210, the open date transmitting unit 220, a requested time determining unit 230, and an update information transmitting unit 240.

The predetermined value transmitting unit 210 may transmit information about a predetermined value used for adjusting a time, at which the device 10 transmits the update request information, to the device 10.

The predetermined value transmitted by the predetermined value transmitting unit 210 may be a predetermined value randomly selected by using a random function within a predetermined range.

The open date transmitting unit 220 may transmit the information about the update open time to the device 10.

For example, when the update open time transmitted by the open date transmitting unit 220 is 14:35, the open date transmitting unit 220 may transmit the update open time received by the open date receiving unit 120 to each device 10 in the form of 1435.

That is, the update open time, 00:00 to 23:59, transmitted by the open date transmitting unit 220 may be expressed in the form of 0000 to 2359, which is, but, only an example, and other cases are not excluded.

The predetermined value transmitted by the predetermined value transmitting unit 210 may be expressed in a form of a natural number of a value randomly selected within a range of 1 minute to 60 minutes. For example, when the predetermined value is 27 (minutes), a form of the predetermined value transmitted by the predetermined value transmitting unit 210 may be 27.

In the above example, the update time calculating unit of the update executing apparatus 100 may convert the update open time of 1435 transmitted by the open date transmitting unit in the unit of a millisecond, convert the received predetermined value of 27 in the unit of a millisecond, and calculate an update time by adding the update open time converted in the unit of a millisecond and the predetermined value converted in the unit of a millisecond.

A request receiving unit may receive information about a request for updating the specific application installed in the device 10 from the device 10.

The requested time determining unit 230 may determine whether a time, at which the update requesting information is received, is after the update open time.

When the update request time is after the update open time as a result of the determination of the requested time determining unit, the update information transmitting unit 240 may transmit update information about the specific application to the device 10.

The update providing server 200 according to the present invention may be applied even to the case of requesting a permission of the update from a user and obtainment of an authority to update the specific application installed in the device 10.

However, the update providing server 200, the update providing method, the update executing apparatus 100, and the update executing method according to the present invention may have maximized effects when the update providing server 200 does not require a permission of a user for the update of the specific application installed in each device 10, an update authority is pre-obtained, and a consent of a user to the device 10 is pre-obtained or a consent of a user to the device 10 is not necessary.

That is, for example, when the specific application desired to be updated by the update providing server 200 according to the present invention is an application related to security, the update providing server 200 may compulsorily update the application related to the security in the device 10 without obtainment of a consent of a user or according to a prior consent, depending on security urgency.

When the update providing server 200 desires to update the application related to security installed in each device 10, the update providing server 200 may set a predetermined range of time considering urgency of the update.

For example, the predetermined range may be set to 1 minute to 60 minutes, and the predetermined value transmitting unit 210 may transmit information about different values randomly selected from values within the predetermined range by using a random function to each device 10.

Even though there are two or more devices 100, for which the same value is selected, in the process of transmitting the information on the different values by using the random function to each device 10, the predetermined value transmitting unit 210 may not perform a process of re-selecting (retrying) a value.

That is, the reason is that the update providing server 200 according to the present invention prevents a load from being concentrated to the server due to the simultaneous concentration of the update, so that it does not matter if there is a plurality of devices 10, for which the same or similar values are selected, within a load with which the update providing server 200 is smoothly operated.

Accordingly, even though there are two or more devices 10, for which the same value is selected, the predetermined value transmitting unit 210 may also transmit the same value to each device 10 without consuming a resource and a time necessary for a process of reselecting (retrying) a value.

However, in order to decrease a probability that the same or extremely similar value is selected, the predetermined value transmitting unit 210 may adjust the number of selectable values included in the predetermined range.

That is, as previously exemplified, when the predetermined range is 1 minute to 60 minutes, the predetermined value transmitting unit 210 may divide the range based on the unit having an interval of 1 minute, and select a predetermined value among 60 selectable values by using the random function.

Otherwise, the predetermined value transmitting unit 210 may divide the range based on the unit having an interval of 0.01 minute, and select a predetermined value among 35,400 selectable values by using the random function.

The predetermined value transmitting unit 210 may set and change the predetermined range considering urgency and importance of upgrade of the specific application.

The predetermined value transmitting unit 210 may set and change the number of values selectable within the predetermined range considering the number of devices 10 in which an application requiring an update is installed, performance of the update providing server 200, a time required for transmitting an update file to one device 10, a communication environment, and the like.

The information on the update open date transmitted by the open date transmitting unit 220 to the device 10 may include information on an update available date and day, as well as the information on the update open time.

Figure 4:
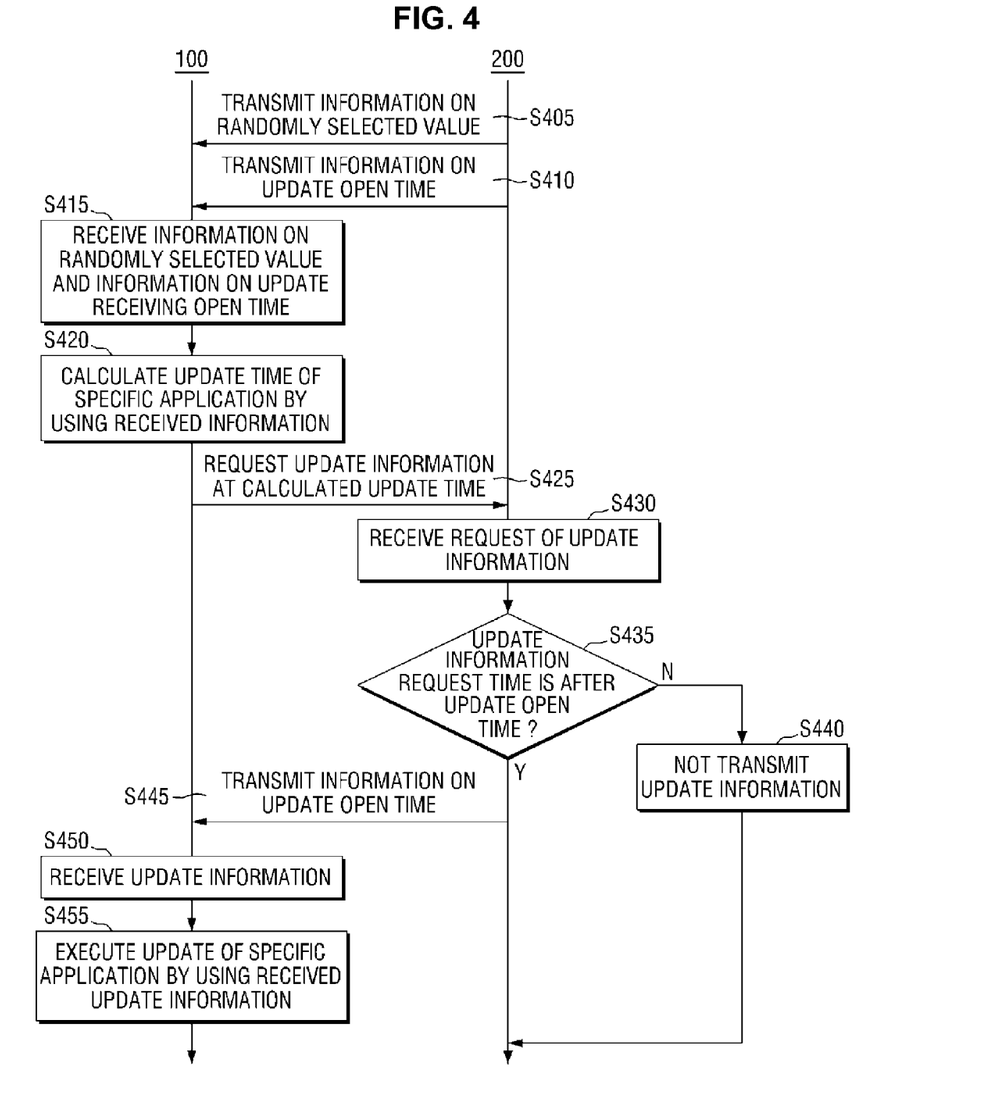
FIG. 4 is a flowchart illustrating an update executing method and an update providing method according to an embodiment of the present invention.

FIG. 4 is a flowchart illustrating an update executing method and an update providing method according to an embodiment of the present invention.

Referring to FIG. 4, the predetermined value transmitting unit 210 of the update providing server 200 may transmit information on a randomly selected value to the device 10 (operation S405).

The open date transmitting unit 220 of the update providing server 200 may transmit information on an update open time of a specific application to the device 10 (operation S410).

The predetermined value receiving unit 110 of the update executing apparatus 100 may receive the information on the randomly selected value transmitted by the predetermined value transmitting unit 210, and the open date receiving unit 120 of the update executing apparatus 100 may receive the information on the update open time transmitted by the open date transmitting unit 220 (operation S415).

The update time calculating unit 130 of the update executing apparatus 100 may calculate an update time or an update request time of the specific application installed in the device 10 including the update executing apparatus 100 by using the information received by the predetermined value receiving unit 110 and the open date receiving unit 120 (operation S420).

As described above, since the predetermined value transmitted by the predetermined value transmitting unit 210 of the update providing server 200 is different for each device 10 (there is a probability that the predetermined values transmitted to several devices 10 are the same as each other, but most of the predetermined values are different from each other), the update time calculated by the update time calculating unit 130 of the update executing apparatus 100 included in each device 10 may be different.

Accordingly, it is possible to prevent a load from being concentrated to the update providing server 200 at a specific moment.

The update information requesting unit 140 of the update executing apparatus 100 may request update information from the update providing server 200 at the update time calculated by the update time calculating unit 130 (operation S425).

The requested time determining unit 230 of the update providing server 200 may receive the update information request transmitted by the update information requesting unit 140 (operation S430), and determine whether the received update information request time is after the update open time (operation S435).

When the update information request time is not after the update open time as a result of the determination of the requested time determining unit 230, the update information transmitting unit 240 of the update providing server 200 may not transmit the update information to the device 10 which requests the update information (operation S440).

However, when the update information request time is after the update open time as a result of the determination of the requested time determining unit 230, the update information transmitting unit 240 of the update providing server 200 may transmit update information including an update file and the like necessary for updating the specific application to the device 10 which requests the update information (operation S445).

The update information receiving unit 150 of the update executing apparatus 100 may receive the update information transmitted from the update providing server 200 (operation S450), and the update executing unit 160 may execute an update of the specific application installed within the device 10 by using the update information received by the update information receiving unit 150 (operation S450).

The aforementioned update providing method may be implemented as a computer readable code in a computer readable recording medium.

That is, the recording medium implementing the update providing method according to the present invention may record a program performing the operation of receiving information the randomly selected value among the values within the predetermined range from the update providing server 200, the operation of receiving the information on the update open time from the update providing server 200, the operation of calculating the update time of the specific application by using the received information on the randomly selected value and on the update open time, the operation of receiving the update information about the specific application from the update providing server 200 at the calculated update time, and the operation of executing an update of the specific application by using the received update information.

The computer-readable recording medium includes all types of recording media in which data readable by a computer system is stored. Examples of the non-transitory computer readable recording medium include a RAM, a ROM, a CD-ROM, a magnetic tape, an optical data storing device, and a floppy disk, and a transitory computer readable recording medium may be implemented in the form of transmission through the Internet and a carrier wave.

The computer readable recording medium may be distributed in computer systems connected through a network, and a computer readable code may be stored therein and executed in a distributed manner. Further, a functional program, code, and code segments for implementing the recording method may be easily deducted by programmers in the art to which the present invention pertains.

Each constituent element of FIGS. 2 and 3 may mean software, or hardware, such as field-programmable gate array (FPGA) or application-specific integrated circuit (ASIC). However, the constituent elements may not be limited to the software or the hardware, and may be configured to be included in an addressable storing medium, or to execute one or more processors. Functions provided by the constituent elements may be implemented by more divided constituent elements, and one constituent element performing a specific function by combining a plurality of constituent elements.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. An apparatus configured to execute an update of a specific application installed in a device, the apparatus comprising:
   a processor; and
   a storage having stored thereon a program that, when executed by the processor, instructs the processor to implement:
   a predetermined value receiving unit configured to receive information indicating a value randomly selected by an update providing server from among values within a predetermined range;
   an open date receiving unit configured to receive, from the update providing server, information indicating an update open time;
   an update time calculating unit configured to calculate an update request time for the specific application based on the randomly selected value and on the update open time;
   an update information receiving unit configured to receive update information about the specific application after the calculated update time; and an update executing unit configured to execute an update of the specific application based on the received update information, wherein the randomly selected value is a value selected by the update providing server using a pseudo-random function, and wherein the predetermined range is set and changed by the update providing server based on at least one of:
- an urgency and importance of the update of the specific application,
- a number of devices in which an application requiring the update is installed,
- a performance of the update providing server,
- a time required for transmitting an update file to one device, and
- a communication environment.

2. The apparatus of claim 1, wherein the update time calculating unit is further configured to calculate the update request time of the specific application by adding the received randomly selected value to the update open time.

3. The apparatus of claim 1, wherein the update executing unit is further configured to receive the update information, and to execute the update of the specific application only after a predetermined time.

4. A server for providing an update, comprising:
an open date transmitting unit configured to transmit information indicating to a device an update open time pertaining to a specific application;
a request receiving unit configured to receive information from the device requesting an update of the specific application;
a requested time determining unit configured to determine whether a time of receiving the update request information is after the update open time; and
an update information transmitting unit configured to, in response to the time determining unit determining that the update request time is after the update open time, transmit update information to the device to update the specific application,
wherein the server is configured to randomly select the predetermined value for each said device from values within a predetermined range by using a pseudo-random function, and
wherein the server is further configured to set and change the predetermined range based on at least one of:
- an urgency and importance of the update of the specific application,
- a number of devices in which an application requiring the update is installed,
- a performance of the server,
- a time required for transmitting an update file to one device, and
- a communication environment.

5. The server of claim 4, further comprising a predetermined value transmitting unit configured to transmit information indicating to the device a predetermined value to be used for adjusting a time at which the device transmits the update request information.

6. A method of providing an update of a specific application installed in a device by a server, the method comprising:
transmitting, by the server to the device, information indicating an update open time;
receiving, by the server from the device, information requesting an update of a specific application installed in the device;
determining, by the server, whether a time of receiving the update request information is after the update open time; and
transmitting, by the server in response to determining that the update request time is after the update open time, update information for the specific application to the device,
wherein the predetermined value is randomly selected by the server for each said device from the values within a predetermined range by using a pseudo-random function, and
wherein the predetermined range is set and changed by the server based on at least one of:
- an urgency and importance of the update of the specific application,
- a number of devices in which an application requiring the update is installed,
- a performance of the server,
- a time required for transmitting an update file to one device, and
- a communication environment.

7. The method of claim 6, further comprising transmitting, by the server to the device, information indicating a predetermined value to be used for adjusting a time at which the device transmits the update request information.

* * * * *